(12) United States Patent
Eck (10) Patent No.: US 8,952,290 B2
(45) Date of Patent: Feb. 10, 2015

(54) METHOD AND APPARATUS FOR THE THERMAL TREATMENT OF A WORKPIECE BY MEANS OF A LASER BEAM

(75) Inventor: Karl Eck, Gross-Umstadt (DE)

(73) Assignee: Messer Cutting Systems GmbH, Gross-Umstadt (DE)

( * ) Notice: Subject to any disclaimer, the term of this patent is extended or adjusted under 35 U.S.C. 154(b) by 610 days.

(21) Appl. No.: 13/192,779

(22) Filed: Jul. 28, 2011

(65) Prior Publication Data

US 2012/0024832 A1 Feb. 2, 2012

(30) Foreign Application Priority Data

Jul. 30, 2010 (DE) .......................... 10 2010 032 958

(51) Int. Cl.
| | |
|---|---|
| *B23K 26/06* | (2014.01) |
| *B23K 26/08* | (2014.01) |
| *B23K 26/10* | (2006.01) |
| *B23K 26/12* | (2014.01) |
| *F16H 1/12* | (2006.01) |
| *B23K 26/38* | (2014.01) |
| *B23K 26/04* | (2014.01) |

(52) U.S. Cl.
CPC ............... *B23K 26/38* (2013.01); *B23K 26/046* (2013.01)
USPC ............ 219/121.75; 219/121.73; 219/121.74; 219/121.76; 219/121.77; 219/121.78; 219/121.79; 219/121.8; 219/121.81; 219/121.83; 219/121.84; 219/121.85; 74/421 R (58) Field of Classification Search
USPC ........................... 219/121.75, 121.73–121.74, 219/121.76–121.77, 121.78–121.81, 219/121.6–121.72, 121.84; 74/421 R
See application file for complete search history.

(56) References Cited

U.S. PATENT DOCUMENTS

| | | | | |
|---|---|---|---|---|
| 3,576,965 A | * | 5/1971 | Gugger | ...................... 219/121.7 |
| 3,751,173 A | * | 8/1973 | Sanz et al. | ..................... 356/246 |
| 3,973,448 A | * | 8/1976 | Michelsen | .................. 74/421 R |

(Continued)

FOREIGN PATENT DOCUMENTS

| | | |
|---|---|---|
| DE | 10 2008 030 783 B3 | 8/2009 |
| DE | 10 2008 053 397 A1 | 12/2009 |

(Continued)

OTHER PUBLICATIONS

Patent Abstracts of Japan, publication No. 06-039571, Jul. 28, 1992, Hitachi Mach. Co. Ltd.

(Continued)

*Primary Examiner* — Dana Ross
*Assistant Examiner* — Gyounghyun Bae
(74) *Attorney, Agent, or Firm* — Tiajoloff and Kelly LLP (57) ABSTRACT

In the thermal cutting of a workpiece by means of a laser beam, said beam is generated by means of a laser source and supplied to a movable laser head. In the laser head, an optical deflection element is provided for deflecting the laser beam such that, when viewed in working direction, it encloses a tilt angle ($\alpha$) differing from 0 degrees with the longitudinal axis of the laser head. Starting therefrom, to produce the inclination of the collimated laser beam to the vertical with a very small number of optical components if possible, the invention suggests that the laser beam is supplied to the laser head by means of an optical fiber and the laser beam is collimated, passes through the deflection element laterally offset to the longitudinal axis of the laser head and is deflected by means of said element onto the workpiece surface and focused at the same time.

13 Claims, 3 Drawing Sheets

(56) References Cited

U.S. PATENT DOCUMENTS

| | | | |
|---|---|---|---|
| 4,258,246 A * | 3/1981 | Karube et al. | 219/121.8 |
| 4,572,941 A * | 2/1986 | Sciaky et al. | 219/121.64 |
| 4,896,944 A * | 1/1990 | Irwin et al. | 359/813 |
| 4,941,093 A * | 7/1990 | Marshall et al. | 606/5 |
| 4,969,722 A * | 11/1990 | Akeel | 359/641 |
| 4,983,796 A * | 1/1991 | Griffaton | 219/121.63 |
| 5,059,759 A | 10/1991 | Kudo et al. | |
| 5,216,222 A * | 6/1993 | Masuda | 219/121.78 |
| 5,371,582 A * | 12/1994 | Toba et al. | 356/73 |
| 5,406,042 A * | 4/1995 | Engelfriet et al. | 219/121.68 |
| 5,446,256 A * | 8/1995 | Cartry | 219/121.63 |
| 5,616,261 A * | 4/1997 | Forrest | 219/121.63 |
| 5,712,701 A * | 1/1998 | Clementi et al. | 356/237.2 |
| 6,566,628 B2 * | 5/2003 | Vogt et al. | 219/121.69 |
| 6,639,177 B2 * | 10/2003 | Ehrmann et al. | 219/121.68 |
| 7,145,710 B2 * | 12/2006 | Holmes | 359/279 |
| 7,297,087 B2 * | 11/2007 | Degen et al. | 475/347 |
| 2011/0108533 A1 | 5/2011 | Boettcher et al. | |
| 2011/0120982 A1 | 5/2011 | Sepp et al. | |

FOREIGN PATENT DOCUMENTS

| | | |
|---|---|---|
| EP | 1 698 426 A1 | 6/2006 |
| JP | 06-039571 | 2/1994 |

OTHER PUBLICATIONS

Espacenet, English-language abstract for DE 102008053397 A1, Dec. 3, 2009, Fraunhofer et al.

Espacenet, English-language abstract for DE 102008030783 B3, Aug. 13, 2009, Sepp et al.

* cited by examiner

METHOD AND APPARATUS FOR THE THERMAL TREATMENT OF A WORKPIECE BY MEANS OF A LASER BEAM

The invention relates to a method for the thermal treatment, particularly for the thermal cutting, of a workpiece with a laser beam which is generated by means of a laser source, said laser beam is supplied to a laser head having a longitudinal axis and being movable relative to the surface of the workpiece in a working direction, said laser beam exits via a nozzle towards the workpiece, at least one optical deflection element being provided in the laser head for deflecting the laser beam such that, when viewed in working direction, it encloses a tilt angle α differing from 0 degrees with the surface normal to the workpiece surface.

Furthermore, the present invention relates to an apparatus for the thermal treatment of a workpiece with a laser beam, particularly for thermal cutting, comprising a laser source for generating the laser beam, a laser head which has a longitudinal axis and which is made movable relative to the surface of the workpiece in working direction, and which is provided with a nozzle through which the laser beam exits towards the workpiece, the laser head containing at least one optical deflection element by means of which the laser beam can be deflected such that it encloses a tilt angle (α) differing from 0 degrees with the longitudinal axis of the laser head.

The thermal treatment of the workpiece comprises cutting, welding, marking, hardening, profiling or removing the surface. The thermal cutting of workpieces is normally carried out through the combined use of a focused laser beam and a gas jet. Depending on the separating mechanism, a distinction is made between laser-beam fusion cutting, laser-beam evaporation cutting or laser flame cutting.

Laser-beam fusion cutting is widespread. A material separating process is here carried out in that the material is fused by the heating power of the laser beam in the area of the cutting front and is driven out of the cut joint by the simultaneous pulse transmission of the cutting gas jet. High-power lasers, particularly $CO_2$, fiber, disk and diode lasers, are used, wherein predominantly circularly polarized or unpolarized laser radiation is used to avoid any directional dependency in the absorption behavior in contour cuts.

PRIOR ART

With regard to the total efficiency, it should be the aim of the cutting process to apply the laser power not vertically but at an angle onto the workpiece surface to be treated, for there is a pronounced maximum in the absorption degree for a specific value of the angle of incidence of the laser beam which corresponds approximately to the polarization angle (or "Brewster angle") $\phi_{Br}$ and which depends on the material and the process parameters and is e.g. in the range of about 85 degrees for radiation of a wavelength of about 1 µm.

The angle of incidence is here the angle between the melt front and the optical axis of the laser beam, and the Brewster angle is the material-specific angle at which, of incident unpolarized light of a given wavelength, only the fractions polarized vertically to the plane of incidence are reflected.

If laser-beam fusion cutting is carried out with constant process parameters, a quasi-stationary cutting front is formed in the cut joint with a material-specific inclination angle $\phi_c$, so that also a laser beam oriented vertically relative to the workpiece surface impinges on the cutting front at a specific angle of incidence $\phi_{in}$. The angle of incidence depends substantially on the focal radius of the laser beam (and thus on the laser wavelength), on the focal place and on the beam caustic and also on the thickness of the workpiece to be cut, and it has a major effect on the absorption of the applied laser power for the above-mentioned reason. It is however not freely adjustable.

Especially when laser beam sources of a short wavelength (e.g. of around 1 µm) are used, an inclination angle $\phi_c$ of the cutting front that is not optimal may be obtained, which leads to a reduction of the absorbed laser power and thus to a deterioration of the process efficiency.

To counteract such a situation, DE 10 2008 053 397 A1 suggests that the inclination angle $\phi_c$ of the cutting front should be reduced, namely by changing the geometry of the laser beam (beam formation) and/or by a nonlinear oscillating deflection of the laser beam superimposed on the uniform relative movement between laser beam and workpiece and by an associated movement of its focal point.

It is here the aim to constantly change the inclination angle $\phi_c$ of the cutting front such that the incident angle $\phi_{in}$ with respect to the cutting front is within an interval around the Brewster angle $\phi_{Br}$. The cutting front geometry is varied by beam formation of the laser beam in that said beam is formed with a rectangular or oval beam cross-section.

If this beam formation is carried out by using baffles or masks, a part of the radiation power is cut off and is not available for the cutting process. Lasers with a rectangular or oval beam cross-section are difficult to produce and expensive.

Instead of a laser beam oriented orthogonally relative to the workpiece surface, it is also possible to use devices that permit a tilting of the laser head. Such a method is e.g. known from DE 10 2008 030 783 B3. Such devices for laser beam angle cutting are e.g. used for fiber cutting and are designed for large tilt angles and are thus large and expensive.

The problem arises here that the media supply lines as well as the drive for adjusting the bevel angle must be rotatable by more than +/−360°. The media supply lines are here either twisted or the media and power supply is rotatorily decoupled from the rotational movement, e.g. via rotary feedthroughs. Rotary feedthroughs for gases or electric current are however prone to failure and expensive: A separate drive which must be co-rotated is needed for tilting the laser head, which makes the unit heavy and less dynamic on the whole.

In the above-explained treatment methods a laser beam is generated by means of a laser beam source and supplied to a laser head. The housing of the laser beam protectively accommodates components needed for focusing the laser beam. For instance, the lens by means of which the laser beam is focused onto the workpiece and a nozzle which serves to supply the cutting gas are normally positioned inside the laser head.

An alternative method for the thermal treatment of a workpiece by means of a laser beam obliquely impinging on the workpiece surface is described in DE 103 31 695 A1. The method suggested therein is without a laser head. The laser beam is collimated and reflected on optical deflection elements repeatedly, the laser beam being directed by the last reflection onto the workpiece, namely obliquely at an angle differing from 90 degrees. The plural reflection of the laser beam and its inclined position are to enable an arrangement of the optical deflection elements at a great distance and in an orientation relative to the workpiece that reduces the deposition of removal products on the optically operative surfaces of the deflection elements.

A sharp and targeted imaging of the laser beam on the workpiece requires, however, great efforts for mounting and adjusting the deflection elements. Fogging and soiling of the optical reflection surfaces cannot be avoided completely under the rough work conditions prevailing in practice. More-over, the assembly requires a certain height of the free space above the treatment plane that is however often not available.

A device of this type is also known from EP 1 698 426 A1. This publication suggests for the laser cutting of conical bores by means of a laser beam which is obliquely incident on the workpiece surface that the collimated parallel laser beam should pass through a glass cylinder which is tilted between two optical wave plates (λ/4 plates) relative to the laser beam axis. From the rear wave plate the laser beam passes to an obliquely positioned mirror and from there to a collecting lens that focuses the beam on the workpiece. The inclination angle of the laser beam relative to the optical axis is changed by the degree of tilt of the glass cylinder. By rotation of the glass cylinder the inclined laser beam in focus describes an enveloping circle about the optical axis.

A laser cutting method and an apparatus of the aforementioned type are known from JP 06 039 571 A. A collimated parallel laser beam is coaxially supplied to the laser head via a mirror and passes through a tiltable deflection element arranged in the laser head before it is focused by means of a collecting lens at an oblique angle onto the workpiece surface. Adjusting screws are provided for adjusting the degree of tilt of deflection element and gas exit nozzle. Deflection element and gas exit nozzle are rotatably supported within the laser head (in the fixed condition of the laser head).

In the laser cutting device known from U.S. Pat. No. 5,059,759 A, the laser nozzle is inclined towards the vertical due to the design. The collimated and parallel laser beam enters the hollow laser head in vertical direction and exits coaxially relative to the middle axis of the laser nozzle. To tilt the laser beam inside the laser head, mirrors are arranged in said head. The first mirror produces a tilting of the laser beam by 90 degrees and the second mirror produces the predetermined tilting of at least 10 degrees relative to the vertical. The laser beam tilted in this way impinges on a collecting lens and is focused by means of said lens onto the workpiece.

In the three last-explained apparatuses and methods, an already parallelized laser beam is supplied to the laser head. This beam parallelization is normally carried out by means of an upstream collimator optic. To produce the inclination of the laser beam to the vertical, the laser beam subsequently passes through a number of further optical components to be focused in the end by means of the collecting lens on the workpiece.

TECHNICAL OBJECTIVE

With the number of the optical components for implementing the inclination of the collimated laser beam, the efforts in terms of material, design and adjustment are increasing. Dimensional deviations, adjusting errors, scattering and absorption of the laser radiation in the components and on surfaces lead to transmission losses and thus at the same time to a heating of the components. This heating just like gradual damage to the optical components by high-energy laser radiation and soiling of the surfaces during operation can again lead to a deterioration of the imaging properties and to further transmission losses and to increased maintenance requirements of the apparatus.

It is therefore desirable to configure the inclination angle of the collimated laser beam to the vertical with a very small number of optical components if possible.

It is therefore the object of the present invention to indicate a method for the thermal treatment of workpieces with laser radiation that provides a high degree of absorption for the laser radiation while making small demands on equipment and maintenance and that is distinguished by a low susceptibility to failure.

It is further the object of the present invention to provide an apparatus suited for performing the method that requires a small number of optical components for producing the inclination of the collimated laser beam to the vertical.

GENERAL ILLUSTRATION OF THE INVENTION

As for the method, this object, starting from a method of the aforementioned type, is achieved according to the invention in that the laser beam is supplied to the laser head by means of an optical fiber, said laser beam is collimated, it passes through the deflection element laterally offset to the longitudinal axis of the laser head and it is deflected by means of said element onto the workpiece surface and focused at the same time.

The invention relates to a development of a thermal treatment method using a laser head which is moved relative to the workpiece to be treated and said workpiece is treated with the laser beam exiting out of the laser head, for instance by cutting, welding, masking, hardening, profiling or removing the surface. The invention shall now be explained in more detail with reference to "laser cutting" as a representative example of all treatment methods.

The laser beam impinges not orthogonally, but obliquely on the workpiece surface and encloses an angle $\alpha$ with the surface normal. The inclination of the laser beam in the movement direction is here such that a "piercing or lifting cutting" with an "advancing" laser beam is obtained.

A laser beam impinging obliquely on the surface in the area of the angle $\alpha$ allows for a higher cutting speed, a greater cutting depth and a better cutting quality because of the improved absorption of the laser energy. The tilt angle $\alpha$ is in the range of the Brewster angle specific for the material, but need not exactly correspond to it. Typically, the angle $\alpha$ is in the range of 1 to 10 degrees and is thus relatively small.

Instead of the oblique position of the laser head, which is customary in bevel cutting, the laser beam is changed within the laser head by means of an optical deflection element in such a manner that, while being tilted relative to the vertical, it exits out of the nozzle of the laser head and impinges obliquely on the surface to be treated. Hence, the laser beam enters the laser head, passes within the laser head through a beam guiding device which effects a deflection of the laser beam and its oblique impingement on the surface of the workpiece to be treated.

Since the laser beam is obliquely positioned optically and within the laser head, no rotary feedthroughs that are prone to wear are needed. Since the deflection element is arranged inside the laser head, fogging or soiling due to removal products of the workpiece treatment is avoided.

A motor for implementing a tilting of the laser head is not needed. Instead of this, the rotatability of the laser beam tilted to the longitudinal axis must be ensured about the longitudinal axis for implementing cutting contours. The longitudinal axis of the laser head is here the rotational axis at the same time and it normally extends in a direction perpendicular to the surface of the workpiece to be treated.

Such rotatability ensures a constant relation between the cutting direction and the impingement direction of the laser beam also in the case of an obliquely impinging laser beam. It can be achieved in that the whole laser head is rotated together with the beam guiding device about the longitudinal axis or in that only the beam guiding device or a part thereof is rotatable about the longitudinal axis. The last-mentioned procedure permits a fixed laser-head housing, which simplifies the gas supply for the cutting gas. Therefore, a procedure is preferred in which the laser head comprises a housing within which at least a part of the deflection element is rotatably supported.

In contrast to the prior art, the laser beam is supplied to the laser head in the laser cutting method according to the invention by means of an optical fiber. The optical fiber may be part of a fiber bundle. The laser beam coming from the optical fiber is normally strongly divergent and is shaped by means of a collimator into a parallel bundle of rays. Complicated optical mirror structures for beam formation and tracking can be omitted. In this respect the laser beam supply by means of fibers already represents a first measure for reducing the number of necessary optical components.

A second measure consists in supplying the collimated laser beam to the deflection element and in deflecting the laser beam by means of said deflection element not only onto the workpiece surface, but in focusing it at the same time. Hence, only one optical component is needed for deflecting and focusing the laser beam, which is accomplished in the final analysis in that the laser beam passes through the deflection element not coaxially, but laterally offset to the longitudinal axis of the laser head.

The invention thereby helps to considerably reduce the optical components needed for beam guidance and formation, as compared with the prior art. After collimation of the laser beam, only one single component is needed for deflecting and focusing, namely the deflection element.

In the simplest case the deflection element consists of one single optical component. It is intended in a first advantageous method variant that the deflection element comprises a focusing lens through which the collimated laser beam passes offset to the longitudinal axis of the laser head and is thereby deflected onto the workpiece surface and focused at the same time, the focusing lens comprising a lens main axis that extends in a direction coaxial to the longitudinal axis of the laser head.

The focusing lens is preferably a convex-convex lens or a plano-convex lens. It is important that the laser beam passes through the focusing lens eccentrically, i.e. outside the lens main axis proper, so that it is deflected towards the lens main axis due to optical refraction. This effects the necessary focusing of the laser beam onto the area of the workpiece and the desired tilting at the same time. The location of the focus position depends here on the type of treatment. The focus may be positioned above or on the surface of the workpiece, also in the workpiece or thereunder.

In this procedure it has turned out to be advantageous when the laser beam is supplied to the laser head laterally offset to the longitudinal axis of the laser head.

Due to the lateral entry of the laser beam, it impinges eccentrically on the focusing lens without any further deflection even though said lens is arranged in the laser head such that its lens main axis extends in a direction coaxial to the longitudinal axis of the laser head.

For the purpose of deflecting the laser beam the focusing lens can be tilted relative to the direction of incidence of the laser beam and relative to the longitudinal axis of the laser head. This, however, requires a co-rotation of the focusing lens upon rotation of the beam guiding device or of the laser head. This is avoided in a procedure in which the focusing lens comprises a lens main axis that extends in a direction coaxial to the longitudinal axis of the laser head. The focusing lens is here centrally arranged inside the laser head. It extends in rotation-symmetry about the longitudinal axis of the laser head, so that it deflects the laser beam that impinges in parallel with and laterally offset to the longitudinal axis, always at the same angle in cutting direction, namely even in cases where it is not rotated together with the laser head or the beam guiding device. Therefore, in this embodiment the focusing lens with its mount can also be integrated in the laser head such that it seals the lower laser head interior assigned to the workpiece relative to the upper laser head interior. This makes it possible to introduce the cutting gas without any additional seal into the lower interior and to supply it to the nozzle, which promotes the gas supply particularly in the case of a fixed laser-head housing.

The laser beam is supplied to the laser head via an optical fiber. This permits a structure of the apparatus that is simpler and less prone to failure than in the case of a beam delivery via a mirror system. If the optical fiber (which will also stand for a fiber bundle hereinafter) enters laterally offset relative to the longitudinal axis of the laser head into the laser head, the problem of twisting will arise upon rotation of the beam guiding device or of the whole laser head about the longitudinal axis.

To avoid such a situation, it has turned out to be advantageous in modifications of the method in which the laser beam is supplied to the laser head by means of the optical fiber via a feedthrough when said feedthrough comprises a gearing with a drive gear which is rotatable coaxially to the longitudinal axis of the laser head and which is connected in a 1:1 gear ratio to a driven gear with a driven shaft extending in parallel with the longitudinal axis of the laser head, the optical fiber being guided in an arc from the longitudinal axis of the laser head via the driven shaft into the laser head.

The gearing comprises a drive gear which is rotatable in the longitudinal axis of the laser head, and a driven gear of the same diameter, resulting in a 1:1 gear ratio for the gearing. These gearing parts are e.g. connected via traction means, such as a belt. The supply of the optical fiber to the laser head is first coaxial to the longitudinal axis of said laser head and then describes an arc relative to the shaft of the driven gear via which it is introduced, extending in parallel with the longitudinal axis of the laser head, into the laser head. This type of feedthrough in connection with the 1:1 gear ratio prevents a twisting of the fiber during rotation of the beam guiding device about the longitudinal axis.

Preferably, the laser beam is collimated in this method variant in a collimator which is arranged inside the laser head and laterally offset to the longitudinal axis of the laser head.

Viewed in the direction of the laser beam, the collimator is arranged upstream of the focusing lens. It consists of one or more optical components and effects a parallelization of the laser beam so that a parallel laser beam will directly impinge in laterally offset configuration on the focusing lens, i.e. without any further deflection of the parallel laser beam. The optical main axes of collimator and focusing lens extend here in parallel with each other.

In another, also advantageous method variant, it is intended that the deflection element comprises at least one concavely curved specular surface and a convexly curved specular surface opposite thereto, wherein the collimated laser beam is deflected on the concavely curved surface by total reflection onto the workpiece surface and is thereby tilted relative to the longitudinal axis of the laser head and simultaneously focused due to the surface curvature.

The concavely curved specular surface works like a collecting lens for the collimated laser beam, thereby effecting a focusing on the area of the workpiece (i.e., depending on the type of treatment, on or above the workpiece surface, into the workpiece or under the workpiece), with the desired tilting of the laser beam being produced at the same time by the curvature and orientation. Hence, the mirror surface comprises two superimposed curvatures that produce the focusing and tilting of the laser beam. In this embodiment of the method according to the invention, the number of the necessary optical components for focusing and deflecting the laser beam is also minimized thereby, ideally to a single component. The deflection element comprises a convexly curved specular surface opposite to the concavely curved specular surface, so that also upon central entry the laser beam extends laterally offset relative to the longitudinal axis of the laser head and is focused by multiple reflection between the curved specular surfaces onto the workpiece surface and is thereby tilted relative to the longitudinal axis of the laser head.

The convexly curved mirror surface acts as a diverging lens. The cooperation of concavely and convexly curved mirror surfaces effects a tilting and focusing of the laser beam although said beam enters coaxial to the longitudinal axis of the laser head into the laser beam. This avoids the problem of twisting although the laser beam is here supplied by means of an optical fiber.

The concavely and convexly curved mirror surfaces can be configured as separate components. In a particularly preferred configuration of this method variant the concavely and convexly curved specular surfaces form, however, the inner wall of a curved optical waveguide.

This results in a fixed and locally unchanged position of the surfaces relative to each other, which reduces the mounting and adjusting efforts and the susceptibility of the apparatus to failure. The inner wall of the waveguide is configured for a total reflection of the laser beam and designed geometrically such that it leads to a deflection of the laser beam with the desired angle of inclination and to a focusing of the laser beam at the same time. An additional focusing lens is not needed, which further reduces the mounting and adjusting efforts.

The inner wall of the waveguide simultaneously forms the concavely and convexly curved mirror surfaces.

As for the apparatus, the above-indicated object, starting from an apparatus of the aforementioned type, is achieved according to the invention in that an optical fiber is provided for supplying the laser beam to the laser head and a collimator is provided for collimating the laser beam, and that the laser beam passes through the deflection element laterally offset relative to the longitudinal axis of the laser head, the deflection element being adapted to deflect the laser beam onto the workpiece surface and to focus it at the same time. The apparatus according to the invention serves the thermal treatment of a workpiece using a laser head that is moved relative to the workpiece to be treated and said workpiece is treated with the laser beam exiting out of the laser head, e.g. for cutting, welding, marking, hardening, profiling or removing the surface. The invention shall now be explained in more detail with reference to a laser head for "laser cutting" which is a representative example of all treatment methods.

The laser beam exits obliquely out of the laser head and encloses a tilt angle α with the longitudinal axis of the laser head which in the case of a vertical orientation relative to the workpiece surface corresponds to the surface normal to the workpiece surface, the tilt angle lying in the range of the Brewster angle specific for the material, but it need not exactly match said angle. Typically the angle α is in the range of 1 to 10 degrees and is thus relatively small.

A laser beam impinging obliquely on the surface in the area of the angle α allows for a higher cutting speed, a greater cutting depth and a better cutting quality because of the improved absorption of the laser energy.

Instead of the oblique position of the laser head, which is customary in bevel cutting, the laser beam is changed within the laser head by means of an optical deflection element in such a manner that, while being tilted relative to the vertical, it exits out of the nozzle of the laser head and impinges obliquely on the surface to be treated. Hence, the laser beam enters the laser head, passes within the laser head through a beam guiding device which effects a deflection of the laser beam and its oblique impingement on the surface of the workpiece to be treated.

Since the laser beam is obliquely positioned optically and within the laser head, one does not need any rotary feedthroughs that are prone to wear, which results in cost reduction and in an apparatus less prone to failure. Since the deflection element is arranged inside the laser head, fogging or soiling caused by removal products of the workpiece treatment is avoided.

A motor for implementing a tilting of the laser head is not needed. Instead of this, the rotatability of the laser beam tilted about the longitudinal axis must be ensured for performing cutting contours. The longitudinal axis of the laser head is here the rotational axis at the same time and it normally extends in a direction perpendicular to the surface of the workpiece to be treated.

Such rotatability ensures a constant relation between the cutting direction and the impingement direction of the laser beam even in the case of an obliquely impinging laser beam. It can be achieved in that the whole laser head is rotatable together with the beam guiding device about the longitudinal axis, or in that only the beam guiding device or a part thereof is rotatable about the longitudinal axis.

In contrast to the prior art, the laser beam is supplied to the laser head in the laser cutting apparatus according to the invention by means of an optical fiber. The optical fiber may be part of a fiber bundle. The laser beam coming from the optical fiber is strongly divergent as a rule. It subsequently passes through a collimator and is thus formed into a parallel fiber bundle. Complicated optical mirror structures for beam formation and tracking can be omitted. In this respect the laser beam supply by means of fibers already represents a first measure for reducing the number of necessary optical components.

A second measure consists in supplying the collimated laser beam to a deflection element that is not only suited to deflect the laser beam onto the workpiece surface, but also focuses it at the same time. Hence, only one single optical component is needed for deflecting and focusing the laser beam, which is accomplished in the final analysis in that the laser beam passes through the deflection element not coaxially, but laterally offset to the longitudinal axis of the laser head.

The invention thereby helps to considerably reduce the optical components needed for beam guidance and formation, as compared with the prior art. After collimation of the laser beam, only one single component is needed for deflecting and focusing, namely the deflection element.

Advantageous configurations of the apparatus according to the invention become apparent from the sub-claims. Insofar as configurations of the apparatus indicated in the sub-claims copy the procedures mentioned in sub-claims for the method according to the invention, reference is made for the purpose of supplementary explanation to the above observations on the corresponding method claims. The configurations of the apparatus according to the invention as indicated in the remaining sub-claims shall be explained hereinafter.

In a preferred embodiment of the apparatus according to the invention, the deflection element comprises a focusing lens through which the collimated laser beam passes offset to the longitudinal axis of the laser head and is thereby deflected onto the workpiece and focused at the same time. The laser beam is here supplied to the laser head, while being laterally offset to the longitudinal axis of the laser head, by means of an optical fiber via a feedthrough that comprises a gearing with a drive gear which is coaxially rotatable relative to the longitudinal axis of the laser head and which is connected in a 1:1 gear ratio to a driven gear with a driven shaft extending in parallel with the longitudinal axis of the laser head, the optical fiber being guided in an arc from the longitudinal axis of the laser head via the driven shaft into the laser head.

To permit a simple change in the inclination angle of the laser beam in this embodiment, the feedthrough is preferably designed for plural positions for the driven gear that differ in their distance from the longitudinal axis of the laser head.

The distance of the driven gear from the longitudinal axis defines the point of impingement of the collimated laser beam on the focusing lens. The further the point of impingement is away from the optical main axis, the stronger is the deflection of the laser beam towards the optical main axis and the greater is the angle of inclination α between the longitudinal axis of the laser head and the laser beam.

EMBODIMENT

The invention will now be explained in more detail with reference to embodiments and a drawing. Schematically shown is in detail in.

Figure 2:
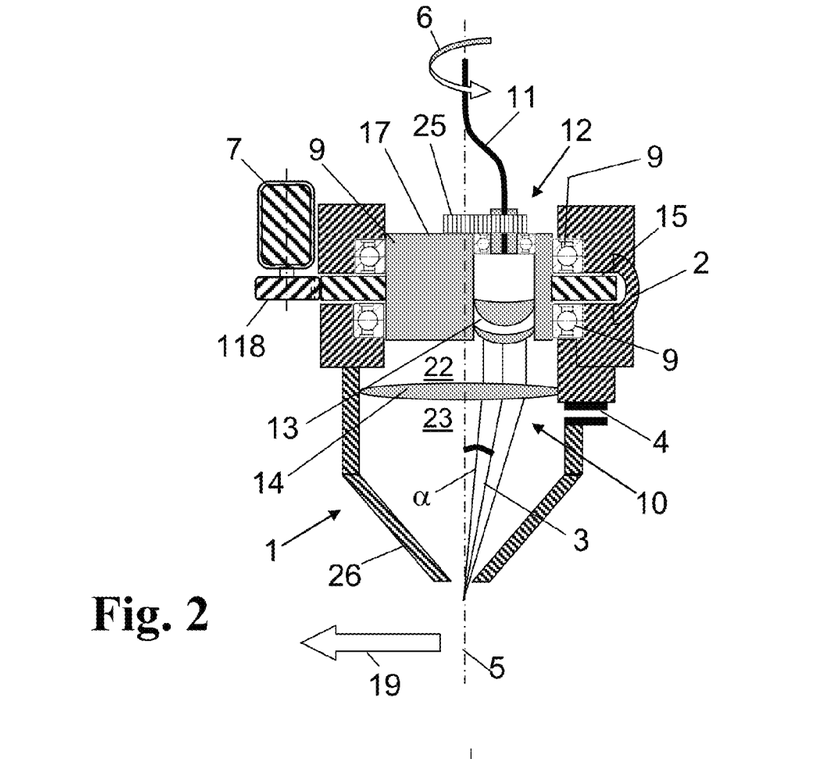
FIG. 2 the optical system of FIG. 1 with laser head housing.

FIG. 2 shows a laser head 1 with a housing 2 and a nozzle 26 through which a cutting gas and a laser beam 3 exit, the laser beam 3 being inclined and focused relative to the vertical. The housing 2 comprises a supply pipe 4 for the supply of the cutting gas.

The housing 2 accommodates an optical system 10 for the supply and formation of the laser beam 3, which is here also called "deflection unit". The optical system 10 comprises a bearing housing 17 for accommodating a lens system which serves as a collimator 13, an optical fiber 11 for the supply of the laser radiation via a feedthrough, which has reference numeral 12 assigned to it on the whole and which is firmly connected to the bearing housing 17, as well as a focusing lens 14.

The components of the system 10 with reference numerals 11, 12, 13 and 17 are rotatable inside the housing 2 about the longitudinal axis 5 of the laser head 1, as is illustrated by the directional arrow 6. The rotatability of these system components is produced by rotary bearings 9, an electric motor 7 and a gearing.

The gearing comprises a gear 15 having a rotational axis extending in a direction coaxial to the longitudinal axis 5 of the laser head, and which surrounds the bearing housing 17 and is firmly connected thereto. The gear 15 meshes with the drive pinion 118 which is connected to the motor shaft of the electric motor 7.

The laser head 1 is movable upwards and downwards by means of a guide unit (not shown) and also along a cutting contour, as is illustrated by the directional arrow 19. The housing 2, however, is not rotatable about the longitudinal axis 5, but firmly connected to the guide unit.

The focusing lens 14 is fixed inside the housing 2 and seals, together with the lens mount, the upper housing chamber 22 with the components of the optical system 10 relative to the gas chamber 23.

Figure 1:
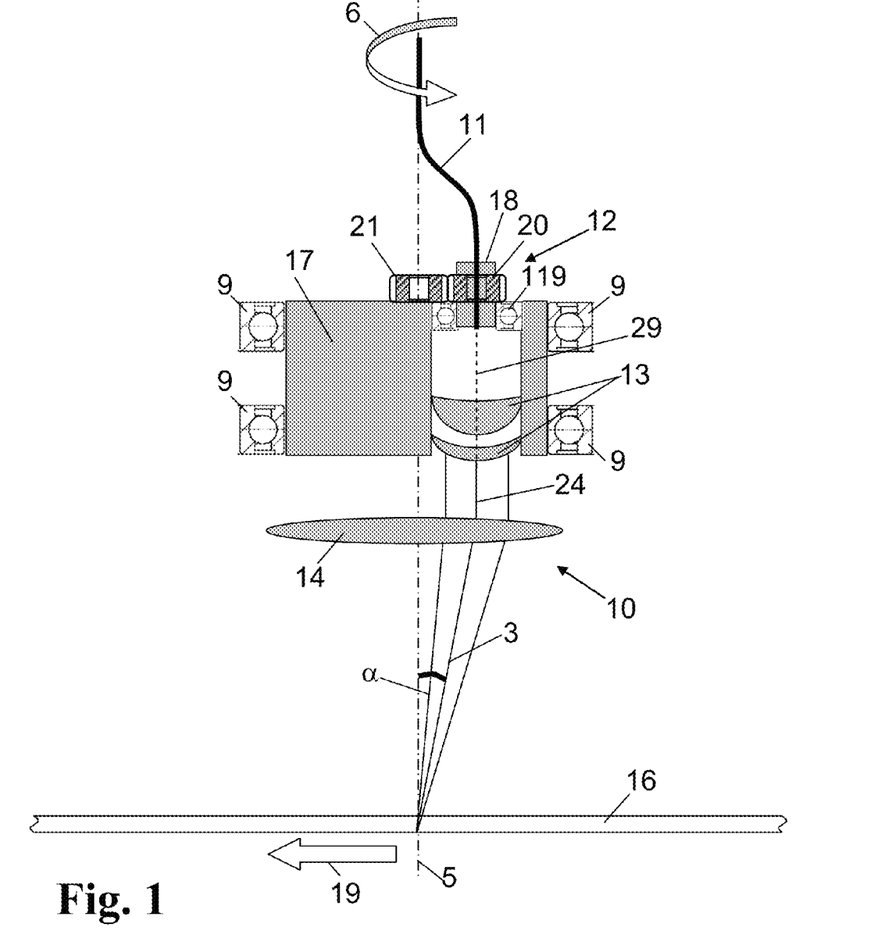
FIG. 1 a first embodiment of an optical system for guiding and forming a laser beam for use in a laser head according to the invention in a side view (without housing of the laser head)

FIG. 1 shows the rotary bearings 9 as well as the optical system 10 on an enlarged scale. The optical system 10 comprises a fiber 11 for supplying the laser radiation via a feedthrough, which has reference numeral 12 assigned to it on the whole, a lens system which serves as a collimator 13, as well as a focusing lens 14. The bearing housing 17 and the system components 11, 12, 13 and 17 fixed thereto or therein are rotatable about the longitudinal axis 5, as has already been explained above in more detail; the focusing lens 14 is fixed inside the laser head.

The laser beam passes via the fiber 11 to the collimator 13, it is collimated there, so that a parallel laser beam 24 with a diameter of 20 mm impinges on the focusing lens 14, namely offset to the optical main axis thereof, which corresponds to the longitudinal axis 5.

The focusing lens 14 acts as a collecting lens and therefore deflects the parallel laser beam 15 towards its optical main axis (=longitudinal axis 5) and simultaneously focuses it onto the workpiece 16. An inclination angle α which is usually in the range of 3° to 10° is formed between the longitudinal axis 5, which is the surface normal to the workpiece surface at the same time, and the direction of incidence of the deflected laser beam 3.

The cutting direction is schematically illustrated in FIG. 1 by the directional arrow 19. The inclination of the laser beam 3 relative to the cutting direction 19 is of the type resulting in a "lifting cutting" action in the case of which the focus of the laser beam 3 precedes the laser beam 15 which is incident in parallel.

The rotary feedthrough 12 comprises a sleeve 18 which is rotatably supported on the upper side of the laser head 1 in ball bearings 119. The sleeve 18, in turn, is fixed in the rotational axis of a gear 20 which is arranged on the upper side of the laser head 1 and which is connected via a belt drive to a central gear 21. The central gear 21 is fixed and its central axis conforms to the longitudinal axis 5 of the laser head 1. The rotational axis of the gear 20 is arranged laterally offset thereto and extends in parallel with the optical main axis 29 of the collimator 13.

The gears 20 and 21 have the same diameter, resulting in a 1:1 gear ratio. The toothed belt 25 running around the gears 20; 21 can be seen in FIG. 2.

The optical fiber 11 is first supplied in the longitudinal axis 5 of the laser head and guided in an arc to the inner bore of the sleeve 18 through which it fully extends.

A rotation of the components 11, 12, 13, and 17 of the optical system 10 around the longitudinal axis 5 effects a rotational movement of the gear 20 around the fixed central gear 21. The gear 20 describes a circle about the longitudinal axis 5 without rotating itself about its rotational axis due to the 1:1 gear ratio. Therefore, this rotational movement does not lead to a twisting of the fiber 11, the arc of which just follows the rotation.

Figure 3:
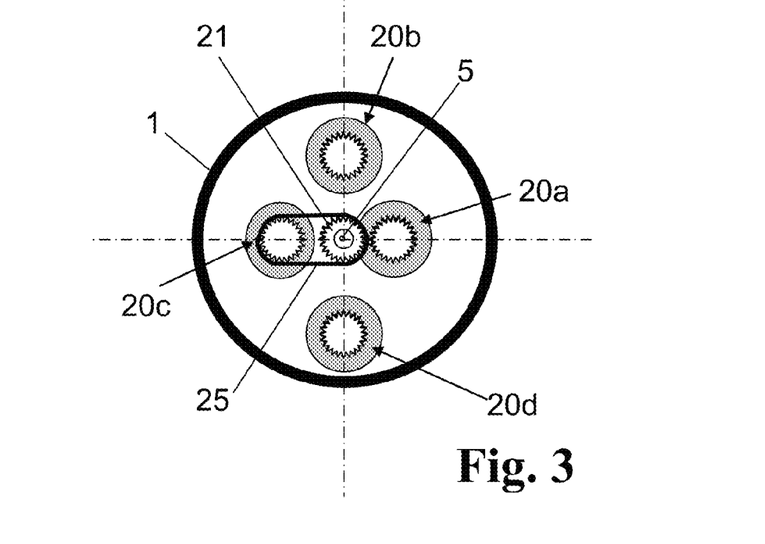
FIG. 3 the laser head of FIG. 1 in a top view from above.

FIG. 3 schematically shows a top view on the laser head according to FIG. 1, wherein the central gear 21 is shown and also different positions 20A, 20B, 20C, 20D for the gear 20 that are each different in their distance from the longitudinal axis 5 (which in this illustration extends perpendicular to the paper plane). Depending on which one of the gear positions 20A, 20B, 20C, 20D is assumed by the sleeve 18 with the fiber 11, and their connection to the central gear 21, one obtains different points of impingement of the parallel laser beam 15 on the focusing lens 14 and thus different angles of inclination α. The inclination angle α of the focused laser beam 3 is thereby easily variable.

Figures 4, 6:
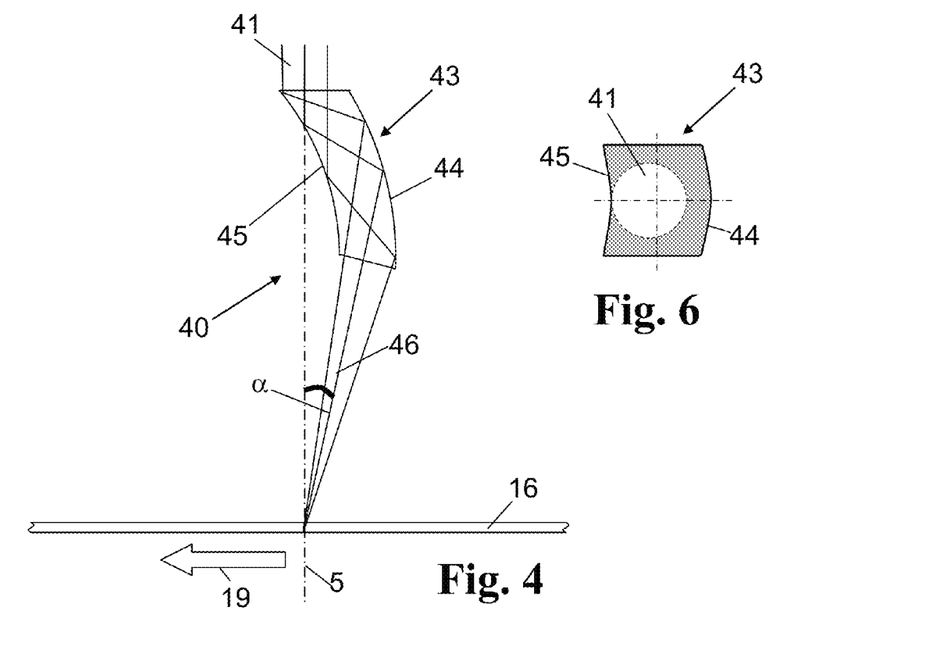
FIG. 4 a second embodiment of an optical system for guiding and forming a laser beam for use in a laser head according to the invention in a side view (without laser head)
FIG. 6 the system for guiding and forming the laser beam of FIG. 4 in a top view.

FIG. 4 schematically shows a different optical system 40 for focusing a parallel laser beam 41 on a workpiece 42. The optical system 40 comprises a bearing housing 47 which is rotatably supported on bearings 9 and in which an optical waveguide 43 of fixed geometry is formed. The waveguide 43 comprises two mirror-coated opposite walls 44, 45 that have each a bend and a curvature in the same direction. The one wall 44 is concavely curved for the impinging laser beam 41 and acts as a collecting lens, and the other wall 45 is convexly curved and acts as a divergent lens.

The bend of the waveguide 43 and the curvature are configured such that under the optical imaging principles the collimated laser beam 41 is focused and tilted relative to the longitudinal axis about the angle α.

To this end the laser beam is supplied to the collimator 42 via an optical fiber (not shown in the figure) in a direction coaxial to the longitudinal axis 5 of the laser head. The parallel laser beam 41 is introduced with a beam diameter of 20 mm into the waveguide 43 via the collimator 42 and is totally reflected several times inside the waveguide 42 and is focused due to the curvature and bend of the waveguide 43 on the workpiece 16 at the same time. The focused laser beam 46 is inclined relative to the longitudinal axis 5 at an angle α ranging from 3° to 10°.

The top view on the waveguide 43 of FIG. 6 shows the curvatures of the mirror-coated walls 44 and 45 by way of an example. The curvatures which can be seen in this view act on the collimated laser beam 41 like a collecting lens and achieve the focusing of the laser beam 41 due to the reflections over the length of the waveguide 43. Hence, both walls 44, 45 have two superposed curvatures that accomplish the focusing and tilting of the laser beam 41.

Figure 5:
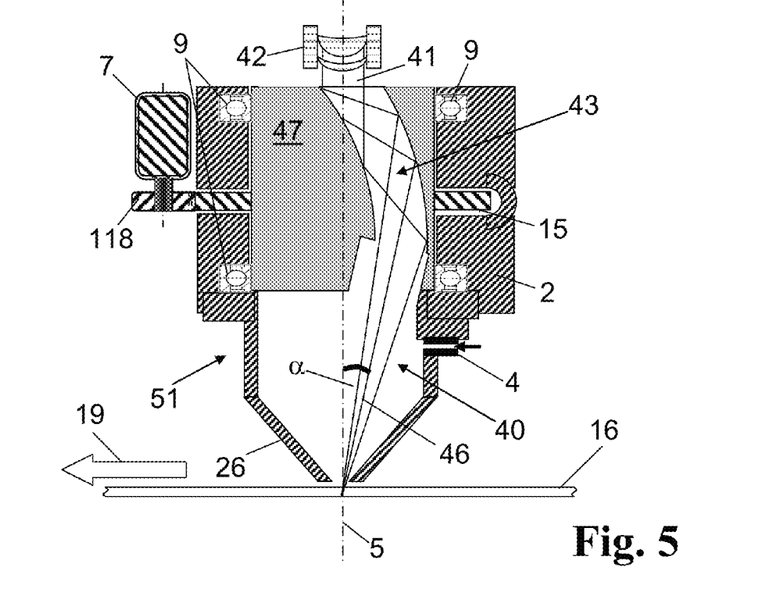
FIG. 5 the optical system of FIG. 4 with laser head housing.

FIG. 5 shows the optical system 40 with the waveguide 43 inside a laser head 51. Like reference numerals as in FIGS. 2, 4, and 5 designate equivalent or like components. Reference is made to the above explanations.

The waveguide 43 assumes the function of a focusing lens and effects the desired deflection of the laser beam at the same time. The laser beam 41 exits in a direction coaxial to the longitudinal axis 5 into a collimator 42 arranged above and outside of the laser head 41. Consequently, the collimated laser beam 41 extends in a direction coaxial to the longitudinal axis 5 and enters into the waveguide 43. It is focused and deflected there, so that it impinges as a focused laser beam 46 through the nozzle 26 on the workpiece 16.

For cutting a desired contour the bearing housing 47 is rotated by means of the motor 7, gearings 15, 18 and rotary bearings 9 together with the waveguide 43 formed therein in cutting direction 19 about the longitudinal axis 5. The collimator 42 and the housing 2 are here not rotated, but only moved together with the laser head 51 along the cutting contour.

The invention claimed is:

1. A method for the thermal treatment of a workpiece, said method comprising:
generating a laser beam using a laser source,
supplying said laser beam to a laser head having a longitudinal axis and being movable relative to a surface of the workpiece in a working direction, wherein said laser beam exits via a nozzle towards the workpiece, the laser head having at least one optical deflection element deflecting the laser beam such that, when viewed in a working direction, the laser beam encloses a non-zero tilt angle relative to a normal to the workpiece surface,
wherein the laser beam is supplied to the laser head by an optical fiber, said laser beam is collimated, said laser beam passes through the deflection element laterally offset to the longitudinal axis of the laser head and said laser beam is at the same time deflected and focused by said element onto the workpiece surface to a point on the longitudinal axis, and
wherein the laser beam orates around the longitudinal axis of the laser head,
wherein the laser beam is supplied to the laser head by the optical fiber via a feedthrough which comprises a gearing with a drive gear which is coaxially rotatable to the longitudinal axis of the laser head and which is connected in a 1:1 gear ratio to a driven gear with a driven shaft extending in parallel with the longitudinal axis of the laser head, the optical fiber being guided in an arc from the longitudinal axis of the laser head via the driven shaft into the laser head.

2. The method according to claim 1, wherein the deflection element comprises a focusing lens through which the collimated laser beam passes offset to the longitudinal axis of the laser head and is thereby deflected onto the workpiece surface and focused at the same time, the focusing lens having a lens main axis that extends coaxial to the longitudinal axis of the laser head.

3. The method according to claim 1, wherein the laser beam is supplied to the laser head while being laterally offset to the longitudinal axis of the laser head.

4. The method according to claim 1, wherein the laser beam is collimated in a collimator which is arranged inside the laser head and laterally offset relative to the longitudinal axis of the laser head.

5. The method according to claim 1, wherein the deflection element comprises at least one concavely curved specular surface and a convexly curved specular surface opposite thereto, the collimated laser beam being deflected on the concavely curved surface by total reflection onto the workpiece surface and tilted in this process relative to the longitudinal axis of the laser head and simultaneously focused due to the surface curvature.

6. The method according to claim 5, wherein the concavely and convexly curved specular surfaces form an inner wall of a curved optical waveguide.

7. An apparatus for the thermal treatment of a workpiece, said apparatus comprising:
a laser source generating a laser beam,
a laser head having a longitudinal axis and being movable relative to the surface of the workpiece in a working direction,
said laser head having a nozzle through which the laser beam exits towards the workpiece,
said laser head containing at least one optical deflection element deflecting the laser beam such that it encloses a non-zero tilt angle relative to the longitudinal axis of the laser head,
wherein an optical fiber supplies the laser beam to the laser head, and a collimator collimates the laser beam, such that the laser beam passes through the deflection element laterally offset to the longitudinal axis of the laser head, the deflection element being adapted to at the same time deflect and focus the laser beam onto the workpiece surface to a point on the longitudinal axis, and wherein the laser beam rotates around the longitudinal axis of the laser head, wherein the laser beam is supplied to the laser head by means of the optical fiber via a feedthrough which comprises a gearing with a drive gear which is rotatable coaxially to the longitudinal axis of the laser head and which is connected in a 1:1 gear ratio to a driven gear with a driven shaft extending in parallel with the longitudinal axis of the laser head, the optical fiber being guided in an arc from the longitudinal axis of the laser head via the driven shaft into the laser head.

8. The apparatus according to claim 7, wherein the deflection element comprises a focusing lens through which the collimated laser beam passes offset relative to the longitudinal axis of the laser head and is thereby deflected onto the workpiece surface and focused at the same time, and which comprises a lens main axis which extends coaxial to the longitudinal axis of the laser head.

9. The apparatus according to claim 7, wherein the supply of the laser beam to the laser head is arranged laterally offset to the longitudinal axis of the laser head.

10. The apparatus according to claim 7, wherein the feedthrough is designed for a plurality of positions for the driven gear that differ in distance thereof from the longitudinal axis of the laser head.

11. The apparatus according to claim 7, wherein the collimator collimating the laser beam is arranged inside the laser head and laterally offset to the longitudinal axis of the laser head.

12. The apparatus according to claim 7, wherein the deflection element comprises at least one concavely curved specular surface and a convexly curved specular surface opposite thereto, the concavely curved specular surface deflects the collimated laser beam by total reflection onto the workpiece surface and focuses the collimated laser beam due to the surface curvature at the same time.

13. The apparatus according to claim 12, wherein the concavely and convexly curved specular surfaces form an inner wall of a curved optical waveguide.

* * * * *